United States Patent [19]
Yee et al.

[11] Patent Number: 6,122,000
[45] Date of Patent: *Sep. 19, 2000

[54] SYNCHRONIZATION OF LEFT/RIGHT CHANNEL DISPLAY AND VERTICAL REFRESH IN MULTI-DISPLAY STEREOSCOPIC COMPUTER GRAPHICS SYSTEMS

[75] Inventors: Daniel E Yee, Loveland; Byron A Alcorn, Ft Collins, both of Colo.

[73] Assignee: Hewlett Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/868,084

[22] Filed: Jun. 3, 1997

[51] Int. Cl.[7] .................................................. H04N 13/04
[52] U.S. Cl. .............................. 348/51; 345/213; 348/56
[58] Field of Search ...................................... 345/213, 202; 341/1; 348/552, 56

[56] References Cited

U.S. PATENT DOCUMENTS

| | | | |
|---|---|---|---|
| 4,495,594 | 1/1985 | Eggebrecht et al. | 364/900 |
| 4,523,226 | 6/1985 | Lipton et al. | 358/88 |
| 4,710,876 | 12/1987 | Cline et al. | 364/414 |
| 4,720,708 | 1/1988 | Takeda et al. | 340/814 |
| 4,760,388 | 7/1988 | Tatsumi et al. | 345/213 |
| 5,241,389 | 8/1993 | Bilbrey | 348/552 |
| 5,289,577 | 2/1994 | Gonzales et al. | 395/163 |
| 5,416,510 | 5/1995 | Lipton et al. | 348/43 |
| 5,488,952 | 2/1996 | Schoolman | 178/660.7 |
| 5,493,595 | 2/1996 | Schoolman | 378/41 |
| 5,523,886 | 6/1996 | Johnson-Williams et al. | 359/464 |
| 5,572,250 | 11/1996 | Lipton et al. | 348/43 |
| 5,790,113 | 8/1998 | Perlman et al. | 345/213 |
| 5,794,016 | 8/1998 | Kelleher | 395/505 |
| 5,805,149 | 9/1998 | Yuki et al. | 345/202 |
| 5,805,913 | 9/1998 | Guttag et al. | 395/800 |
| 5,821,989 | 10/1998 | Lazzaro et al. | 348/56 |
| 5,894,312 | 4/1999 | Ishiwata et al. | 345/504 |

FOREIGN PATENT DOCUMENTS

| | | |
|---|---|---|
| 0734011A2 | 9/1996 | European Pat. Off. .......... G09G 5/12 |
| 09319865 | 12/1997 | Japan . |
| 0416875A2 | 3/1991 | United Kingdom ........... H04N 13/04 |
| 2308284 | 6/1997 | United Kingdom ........... H04N 13/00 |
| 2312122 | 10/1997 | United Kingdom ........... H04N 13/00 |
| WO95/14252 | 5/1995 | WIPO ............................ G02B 21/22 |

OTHER PUBLICATIONS

Lenny Lipton, "Stereo–Vision Formats For Video and Computer Graphics", Printed from http:/www.stereographics.com/htm/body_ www. stereo_ formats.html in Apr. 1997.

Silicon Graphics Promotional Literature, "Infinite Reality Graphics for Stunning Real–Time Interactivity". Printed from http://www.sgi.com/Products/hardware/graphics/technology/graphics.html in Apr. 1997.

IEEE Transactions on Consumer Electronics, vol. 34, No. 3, Aug. 1988, pp. 536–542 "3–Dimensional Personal Computer System".

*Primary Examiner*—Chanh Nguyen
*Assistant Examiner*—Alecia D. Nelson
*Attorney, Agent, or Firm*—Kevin M. Hart

[57] ABSTRACT

Method and apparatus for synchronizing vertical refresh and the display of left versus right channels in a stereoscopic, multi-display computer graphics system. Each graphics pipeline in the system is coupled to its own synchronization controller. The synchronization controllers each have a synchronization input and a synchronization output. The inputs and outputs are coupled in series to form a daisy chain. One of the synchronization controllers is designated the master, the rest are slaves. The master generates a signal that transitions when the master enters vertical front porch. The slaves pass this signal down the daisy chain. Each slave will wait at the end of its own vertical front porch for a transition on the signal. When the transition occurs, the slave immediately enters vertical sync. If no transition occurs within a predetermined time, the slave will enter vertical sync at the end of the predetermined time. The state of the synchronization signal is used by each graphics pipeline to determine which channel, left or right, will be displayed during the upcoming frame.

14 Claims, 5 Drawing Sheets

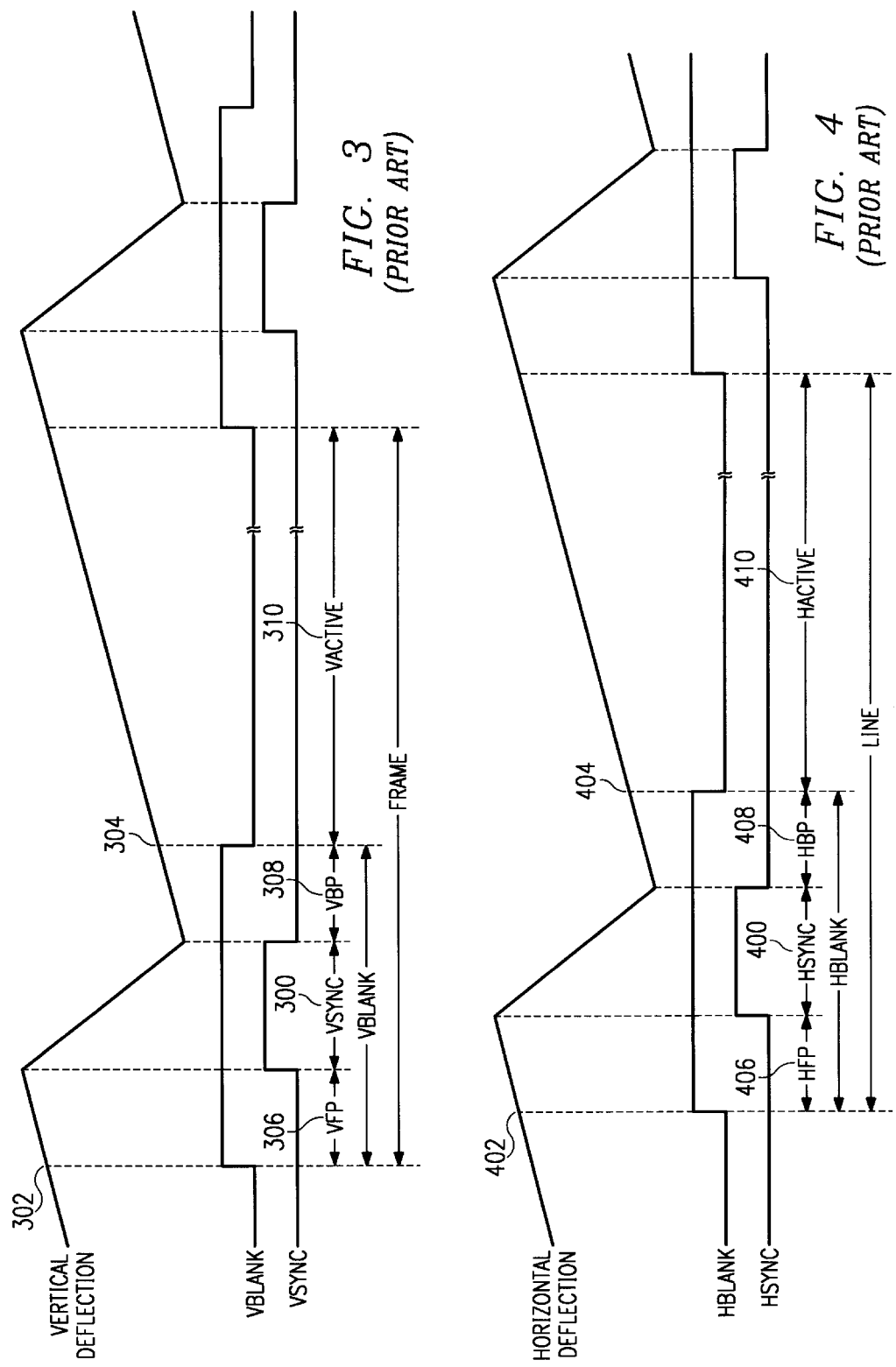

SYNCHRONIZATION OF LEFT/RIGHT CHANNEL DISPLAY AND VERTICAL REFRESH IN MULTI-DISPLAY STEREOSCOPIC COMPUTER GRAPHICS SYSTEMS

FIELD OF THE INVENTION

This invention relates generally to multi-display computer graphics systems, and more particularly to methods and apparatus for synchronizing the display of left and right channels and for synchronizing vertical refresh cycles in stereoscopic multi-display computer graphics systems.

BACKGROUND

As the art of computer graphics has grown in sophistication, uses being made of computer graphics display systems have become increasingly various and creative. For example, in many modern applications, several display systems are employed at once to provide a larger viewing area than could be provided by a single display system operating alone. One such application is known popularly as a "virtual reality theater." In a typical virtual reality theater, multiple computer graphics display systems are used to project images on each of the walls of a room so that an observer within the room can see the images no matter in which direction he or she looks or moves. Often, the presentation of the images changes depending on the observer's position or orientation within the room as indicated by a tracking device. Other types of virtual reality theaters use multiple monitors oriented around a relatively stationary observer. The latter types of virtual reality theaters are frequently used, for example, in flight simulators.

Stereoscopic display techniques are also sometimes employed in computer graphics systems. In stereoscopic applications, left- and right-eye views or "channels" are sequentially and alternately displayed while special eyewear worn by the observer alternately occludes the observer's right and left channels of vision. When the eyewear and the display are synchronized properly, the observer's left eye always sees the left channel and the observer's right eye always sees the right channel. The effect for the observer is binocular stereopsis. In other words, the observer is given the experience of having depth perception while viewing the displayed scene.

If such a stereoscopic technique were to be employed in a multi-display system, then not only must all of the display devices in the system present the same channel (left or right) at the same time, but also the vertical refresh cycles should be synchronized so that all of the display devices in the system begin their vertical retrace at nearly the same time.

By way of background, a typical single-display computer graphics system 100 is shown in FIG. 1. CPU 102, system bus 104, system memory 106 and peripherals 108 represent any host computer system including a personal computer, workstation or mainframe. Display processor 110, frame buffer 112, video controller 114 and CRT monitor 116 represent a typical computer graphics "pipeline" 120 for displaying images generated by the host computer system. Pixel data representing an image are written into frame buffer 112 by display processor 110. (In lower-end systems, display processor 110 may not be present; in such lower-end systems, the host computer system writes pixel data into frame buffer 112 directly.) Video controller 114 reads pixel data from frame buffer 112, converts the pixel data into analog form, and drives CRT monitor 116 by generating appropriate horizontal and vertical timing signals and using the converted pixel data to determine R, G and B beam intensities. For stereoscopic applications, eyewear 118 is provided for alternately occluding the observer's eyes as previously described. Virtual reality theaters and other immersive environments are commonly constructed by using multiple instances of computer graphics pipelines like pipeline 120. Sometimes the multiple pipelines are coupled to a common system bus. For most modern applications, especially those involving stereoscopic computer graphics presentations, it is desirable for video controller 114 and CRT monitor 116 to comprise a progressive-scan rather than an interlaced-format system. Among the reasons for this are the flicker problems that are commonly associated with interlaced-format systems and the resolution reduction that is commonly inherent in stereoscopic interlaced-format applications.

FIG. 2 illustrates the logical organization of video controller 114. Video controller 114 cycles repeatedly through frame buffer 112 one scan line at a time. Raster scan generator 200 generates horizontal timing signals 202 and vertical timing signals 204, which in turn drive the raster scan in CRT monitor 116. Raster scan generator 200 also controls X address register 206 and Y address register 208, which together define what memory location will be specified by linear address generator 210. The memory addresses are generated in synchrony with the timing signals. Pixel data read from the accessed memory locations of frame buffer 112 are used as indices into look-up table 212. The contents of the corresponding locations within look-up table 212 are used to drive digital-to-analog converter ("DAC") 214. DAC 214 in turn produces the R, G and B beam intensity values used by CRT monitor 116.

It is known that raster scan generator 200 usually contains some form of video timing generator for producing horizontal timing signals 202 and vertical timing signals 204. Frequently, such video timing generators produce a V_BLANK signal and a V_SYNC signal as shown in FIG. 3, as well as an H_BLANK signal and an H_SYNC signal as shown in FIG. 4. CRT monitor 116 contains circuitry for generating the vertical and horizontal deflection signals shown in FIGS. 3 and 4, respectively, using the blank and sync signals as inputs. As can be seen in FIG. 3, the vertical deflection ramp signal retraces during VSYNC interval 300. In order to prevent the raster beam from being seen during vertical retrace, the R, G and B intensities are blanked during the retrace. Blanking actually begins at time 302 and ends at time 304. The interval between the beginning of blanking and the beginning of retrace is usually referred to as "vertical front porch" interval 306. The interval between the end of blanking and the beginning of active beam interval 310 is usually referred to as "vertical back porch" interval 308. For purposes of the discussion provided herein, the phrase "vertical refresh activity" will be used to denote any, all or some combination of the intervals 300, 306 and 308.

In the case of fully-programmable video timing generators, four counters might be used, one for each of the timing signals to be produced: V_BLANK, V_SYNC, H_BLANK and H_SYNC. In this manner, the relative lengths of all of the timing intervals may be controlled carefully by loading appropriate values into the counters and then decrementing the counters continuously. (In such an embodiment, a transition in a timing signal occurs whenever its corresponding counter reaches a zero count. The counter is then loaded with a second value corresponding to desired length of the next interval, and so on.) It is know that the intervals produced by such video timing generators may be altered by forcing a reset or load of the counter before the counter expires.

The horizontal timing of FIG. 4 is analogous to the vertical timing of FIG. 3. The horizontal deflection ramp signal retraces during HSYNC interval 400. In order to prevent the raster beam from being seen during horizontal retrace, the R, G and B intensities are blanked during the retrace. Blanking actually begins at time 402 and ends at time 404. The interval between the beginning of blanking and the beginning of retrace is usually referred to as "horizontal front porch" interval 406. The interval between the end of blanking and the beginning of active beam interval 410 is usually referred to as "horizontal back porch" interval 408. It should be noted, of course, that the horizontal cycle is much faster than the vertical cycle, commensurate with the number of lines in each frame. In fact, numerous horizontal retrace cycles may occur during one vertical front porch interval 306. Thus, to identify sub-intervals within vertical front porch interval 306, it is useful to speak in terms of the "first line of vertical front porch" and the "last line of vertical front porch."

For stereoscopic display systems, it is known to equip video controller 114 with left/right channel indicator 216. Left/right channel indicator 216 has a one-bit output for dictating which pixel data is to be used to drive CRT monitor 116 at any given moment. For example, in some stereoscopic implementations, left image data is stored in one memory area while right image data is stored in another memory area. In such implementations, the state of left/right channel indicator 216 is conventionally used by video controller 114 to determine which of the two memory areas should be displayed. The state of left/right channel indicator 216 is also typically used by eyewear 118 to determine which of the viewer's eyes is to be occluded at each moment. In prior art systems, left/right channel indicator 216 is a free-running oscillator; no automatic means is provided for synchronizing it with the left/right channel indicators of other computer graphics pipelines.

Moreover, in multi-display progressive-scan computer graphics systems, synchronization of vertical refresh cycles is complicated because no two crystals are the same. Therefore, no two video controllers have exactly the same clock frequency. The result for prior art progressive-scan multi-display systems is that, even if all video controllers were to begin a first vertical retrace at the same time, each would begin the next vertical retrace at a slightly different time. The systems would get further and further out of synchronization with each cycle.

By way of further background, it is known in interlaced-format environments to use a technique called "genlock." The genlock technique synchronizes vertical retrace, horizontal retrace and color burst phase and frequency among multiple interlaced-format display systems or sources such as those implementing the well-known NTSC composite video format. One by-product of using genlock in interlaced-format multi-display systems is that the timing of presentation for odd lines versus even lines is synchronized for all of the displays in the system. Thus, for stereoscopic multi-display systems that use an interlaced format in which the left channel is displayed on odd lines and the right channel is displayed on even lines, the genlock technique might be used to synchronize the display of left/right channels among the multiple displays, as well as to synchronize the vertical refresh cycles among the displays. As alluded to above, however, it is not desirable to use an interlaced format in stereoscopic applications because such a scheme inherently reduces image resolution by a factor of two. Moreover, the just-described form of genlock does not apply to progressive-scan systems.

It is therefore an object of the present invention to automatically synchronize the presentation of left and right channels by all of the computer graphics pipelines in a multi-display stereoscopic computer graphics system.

It is a further object of the present invention to automatically synchronize the vertical refresh cycles of each of the display devices in a multi-display stereoscopic computer graphics system.

SUMMARY OF THE INVENTION

In one aspect of the invention, a first computer graphics pipeline is coupled to a master synchronization system, and a second computer graphics pipeline is coupled to a slave synchronization system. The master synchronization system has a synchronization output which is coupled to a synchronization input of the slave synchronization system. The master synchronization system is operable to encode left/right channel information and video timing information (corresponding to activity occurring in the first computer graphics pipeline) onto the master synchronization output. The slave synchronization system is operable to manipulate the video timing and the left/right channel display within the second computer graphics pipeline responsive to its synchronization input. The result is to automatically cause the video timing and the left/right channel display in the second computer graphics pipeline to proceed substantially synchronously with the video timing and the left/right channel display in the first computer graphics pipeline. In a further embodiment, numerous slave synchronization systems are present, each coupled to its own computer graphics pipeline. Each slave has a synchronization input and a synchronization output. The synchronization inputs and outputs are coupled in series to form a daisy chain. In the latter configuration, the system is operable to cause all of the slaves to operate in synchrony with the master.

In another aspect, the invention includes a method for substantially synchronizing the vertical refresh cycles in, and the display of left and right channels by, first and second computer graphics display systems in a multi-display stereoscopic computer graphics system. The method includes the steps of: changing the state of a synchronization signal synchronously with vertical refresh activity in the first computer graphics display system; displaying a predetermined one of the left and right channels in the first computer graphics display system responsive to the state of the synchronization signal; communicating the synchronization signal from the first to the second computer graphics display systems; beginning vertical retrace in the second computer graphics display system when the synchronization signal changes states; and displaying a predetermined one of the left and right channels in the second computer graphics display system responsive to the state of the synchronization signal.

In yet another aspect, the invention includes a method of substantially synchronizing the vertical refresh cycles of first and second computer graphics display systems. The method includes the steps of: displaying a first frame in the first computer graphics display system; displaying a second frame in the second computer graphics display system; halting the video timing generator in the second computer graphics display system at a time during vertical front porch in the second computer graphics display system; causing a transition on a synchronization signal synchronously with the beginning of vertical front porch in the first computer graphics display system; waiting a predetermined time in the second computer graphics display system, after halting the video timing generator, for a transition of the synchronization signal; and, if a transition of the synchronization signal occurs during the predetermined time, causing the second computer graphics display system to immediately enter vertical sync. In a further embodiment, if a transition of the synchronization signal does not occur during the predetermined time, the method includes causing the second computer graphics display system to enter vertical sync at the end of the predetermined time.

The invention also includes synchronization logic for use in a multi-display computer graphics system. The inventive synchronization logic includes external sync input/output circuitry having an external sync input and an external sync output; a video timing generator having a vertical refresh status output; and a state machine. In an embodiment, the vertical refresh status output indicates when the video timing generator is in the last line of vertical front porch. The state machine is operable (1) to halt the video timing generator responsive to the vertical refresh status output, (2) to sense transitions on the external sync input, and (3) to cause the vertical timing generator to enter vertical sync responsive to transitions sensed on the external sync input. In a further embodiment, the synchronization logic also includes a programmable master/slave indicator. In such an embodiment, the external sync input/output circuitry is responsive to the programmable master/slave indicator and is operable as follows: (1) when in master mode, the external sync output will be toggled whenever the video timing generator begins vertical front porch; and (2) when in slave mode, the external sync output follows the external sync input. In yet a further embodiment, the synchronization logic includes a time-out counter. In the latter embodiment, the state machine is operable to cause the vertical timing generator to enter vertical sync responsive to the expiration of the time-out counter.

BRIEF DESCRIPTION OF THE DRAWINGS

FIG. 3 is a timing diagram illustrating the vertical timing of the prior art CRT monitor of FIG. 1.

FIG. 4 is a timing diagram illustrating the horizontal timing of the prior art CRT monitor of FIG. 1.

DETAILED DESCRIPTION OF THE PREFERRED EMBODIMENTS

Figure 1:
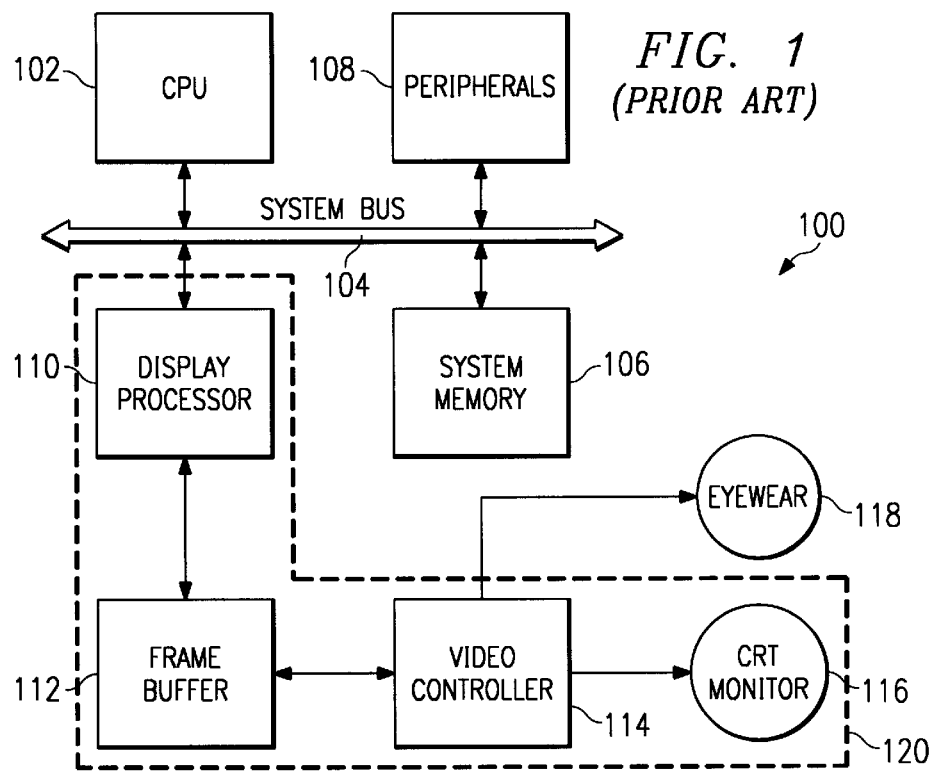
FIG. 1 is a block diagram illustrating a prior art single-display computer graphics system.
Figure 2:
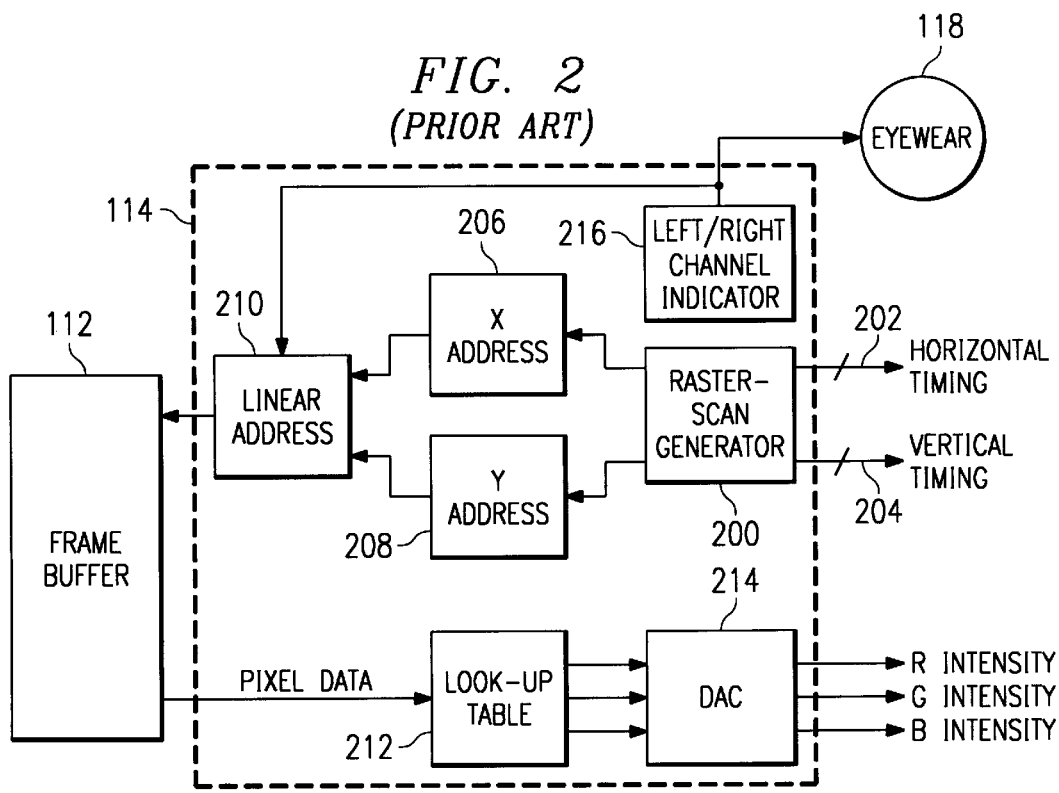
FIG. 2 is a block diagram illustrating the logical organization of the prior art video controller to FIG. 1.
Figure 5:
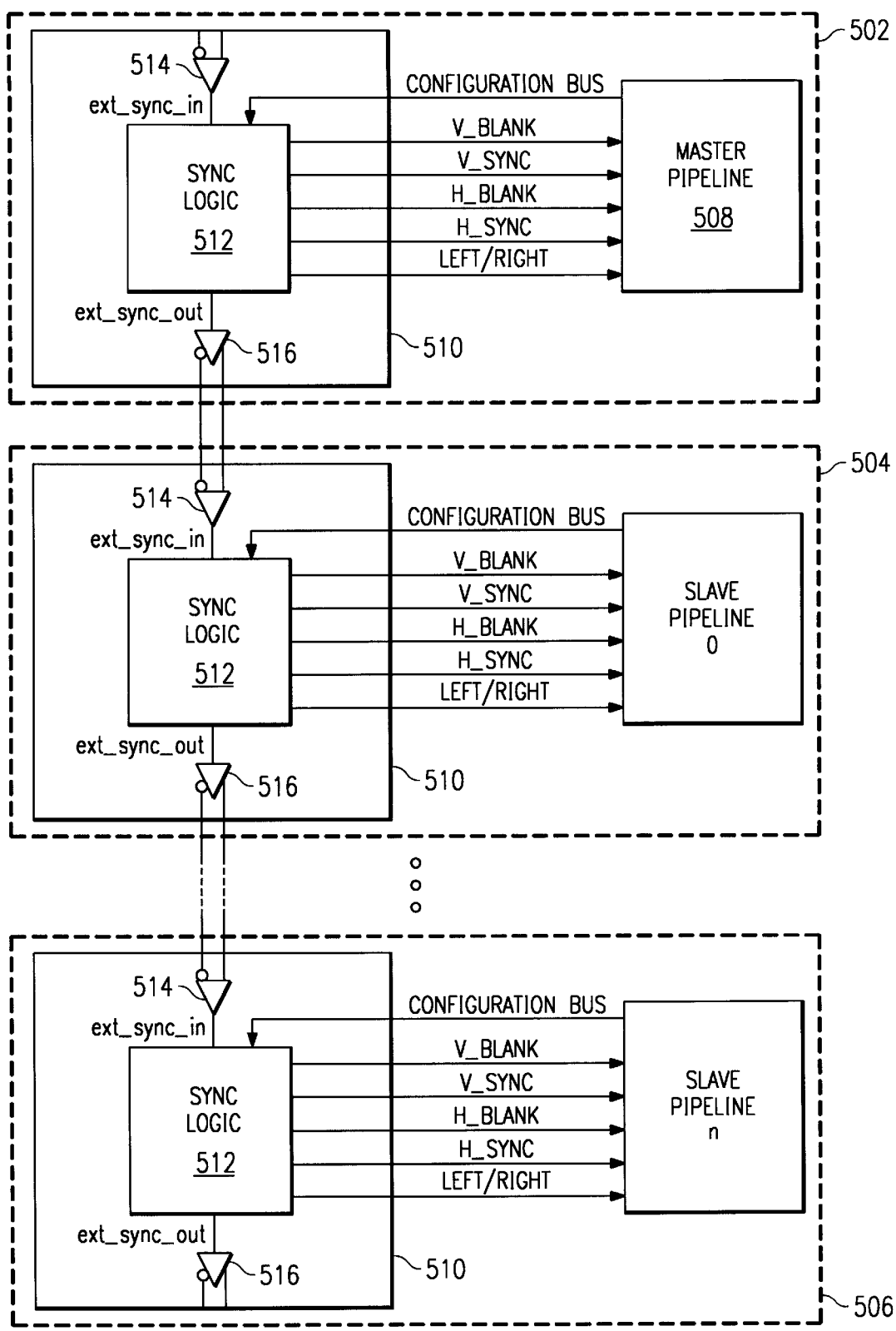
FIG. 5 is a block diagram illustrating a multi-display stereoscopic computer graphics system according to a preferred embodiment of the invention.

FIG. 5 illustrates a multi-display stereoscopic computer graphics system 500 according to a preferred embodiment of the invention. The system includes a master display system 502 and a plurality of slave display systems 504, 506. Master display system 502 contains a master computer graphics pipeline 508. Each of the slave display systems contains a slave computer graphics pipeline indicated in the drawing as slave pipelines 0 through n. Master pipeline 508 and each of slave pipelines 0 through n may be conventional and may be implemented, for example, according to the computer graphics pipeline shown in FIG. 1 with the exception that each of the pipelines in FIG. 5 takes its horizontal and vertical timing inputs, as well as its left/right state input, from a synchronization system 510 as shown. Moreover, a configuration bus should be provided between each pipeline and its synchronization system 510 as shown. The configuration bus may be any conventional set of address, data and control lines suitable for setting and resetting bits in the control registers of synchronization system 510 as will be discussed in more detail below. Each synchronization system 510 contains sync logic 512. Each sync logic 512 has an external sync input "ext_sync_in" and an external sync output "ext_sync_out." The external sync inputs and outputs are connected in series, via conventional differential drivers 516 and receivers 514, beginning with master display system 502 and ending with slave display system 506.

In operation, master display system 502 runs free as if it were the only graphics pipeline in the multi-display system. It causes a transition on its ext_sync_out line every time it enters its vertical blank interval (the beginning of vertical front porch). Each of the slave display systems passes this synchronization signal to the next slave in daisy chain fashion. The synchronization signal is used in each slave in two ways: transitions on the synchronization signal indicate when the next vertical retrace will occur in the slave, and the state of the synchronization signal indicates to the slave which channel (left or right) to display during the next frame. Using the synchronization signal for both of these purposes provides the added advantage that, whenever the display of left versus right channels is switched, the switch always occurs during a vertical retrace. Because of variations in crystal clock frequencies, the frame rate for each display system will be slightly different. To compensate for this, time is added or subtracted from the last horizontal line of vertical front porch in each slave so that all systems enter vertical sync at nearly the same time. Specifically, each slave will enter vertical sync whenever it sees a transition on its ext_sync_in input. If a slave has already finished vertical front porch and has not yet seen a transition, then it will wait a predetermined amount of time at the end of vertical front porch. If it sees the transition during the waiting period, then it will immediately enter vertical sync by forcing a reset or load of the vertical sync counter in the video timing generator. If it does not see a transition before the end of the waiting period, then it will enter vertical sync anyway at the end of the waiting period. (The latter functionality is described in more detail below in connection with the discussion of FIG. 7. In effect, it prevents the entire multi-display system from halting in the event the daisy chain is broken for some reason.)

Figure 6:
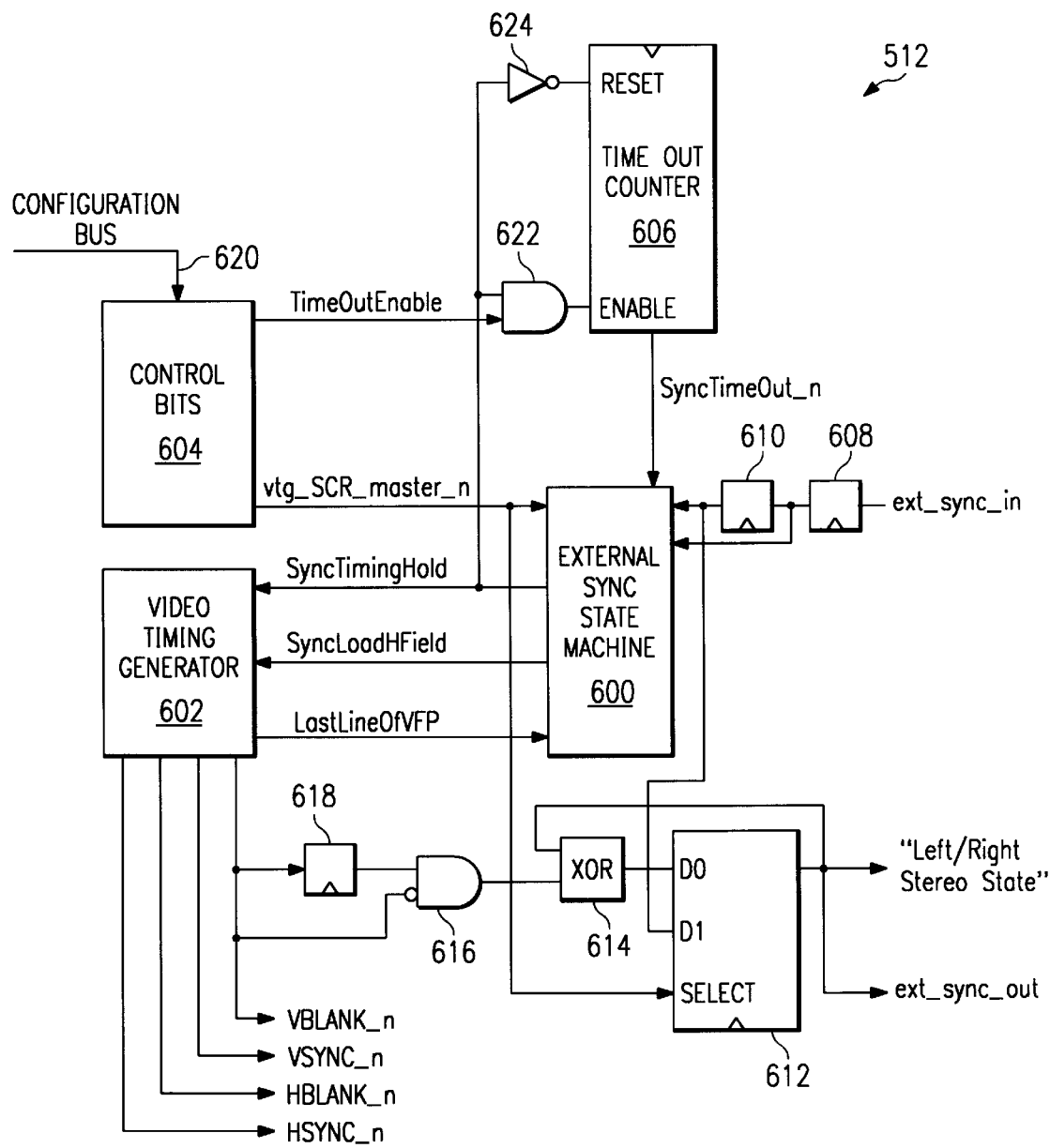
FIG. 6 is a block diagram illustrating the sync logic of FIG. 5 in more detail.

FIG. 6 is a block diagram illustrating the contents of sync logic 512 in more detail. It should be noted that the suffix "_n" appears in signal names to denote "asserted low." In a preferred embodiment, all clock inputs are driven at one-fourth the rate of the dot clock. Sync logic 512 contains external sync state machine 600, video timing generator 602, control bit register 604 and time-out counter 606. Control bit register 604 contains two control bits: time-out_enable and vtg_SCR_master_n. The purpose of the time-out_enable bit is to enable or disable the time-out functionality just described. The purpose of the vtg_SCR_master_n bit is to indicate whether sync logic 512 should act as a master or as a slave. Sync logic 512 is configured to operate in slave mode when this bit is set high, and to operate in master mode when this bit is set low.

Slave Mode: When sync logic 512 is in slave mode, the output of latch 612 will follow input D1. Thus, in slave mode, sync logic 512 will pass a latched version of ext_sync_in to its ext_sync_out output via latch 612. The state of the output of latch 612 is also used as the left/right indicator bit. Whichever graphics pipeline is coupled to sync logic 512 uses the state of this bit to determine which channel (left or right) to display in the upcoming frame.

Master Mode: When sync logic 512 is in master mode, the output of latch 612 will follow input D0. D0, in turn, is coupled to the output of exclusive OR gate 614. The first input of exclusive OR gate 614 is taken from the output of latch 612. The other input of exclusive OR gate 614 is provided by AND gate 616. The non-inverted input of AND gate 616 is coupled to the output of latch 618, which takes its input from V_BLANK_n. The inverted input of AND gate 616 is coupled directly to V_BLANK_n. The output of AND gate 616 will go high for one clock period every time a high-to-low transition occurs on the V_BLANK_n signal (indicating that video timing generator 602 is entering vertical blank). The output of exclusive OR gate 614 will follow the last state of latch 612 whenever the output of AND gate 616 is low, but will toggle the last state of latch 612 whenever the output of AND gate 616 is high. Thus, when sync logic 512 is in master mode, it will cause a transition on ext_sync_out every time it enters vertical front porch. In an alternative embodiment, the input of latch 618 and the inverting input of AND gate 616 may be couple to VSYNC_n instead of VBLANK_n. In such an alternative embodiment, sync logic 512 (when in master mode) will cause a transition on ext_sync_out every time it begins a vertical retrace.

Table A below provides descriptions of the signals in FIG. 6 that have not yet been discussed.

TABLE A

| Signal | Description |
| --- | --- |
| TimeOutEnable | 1 = Enable Time Out Counter |
|  | 0 = Disable Time Out Counter |
| SyncTimeOut_n | 1 = Time Out Counter has not expired |
|  | 0 = Time Out Counter has expired |
| vtg_SCR_master_n | 1 = "slave mode" |
|  | 0 = "mastermode" |
| ext_sync_in | External Sync In |
| ext_sync_out | External Sync Out |
| SyncTimingHold | Causes Video Timing Generator to stop |
| SyncLoadHField | Causes Video Timing Generator to enter vertical sync |
| LastLineOfVFP | Indicates Video Timing Generator has entered last horizontal line time of vertical front porch. |
| "Left/Right Stereo State" | Indicates which stereo eye will be displayed for the current video frame. |

Video timing generator 602 may be conventional except that it should be operable to stop counting whenever SyncTimingHold is asserted and to enter vertical sync immediately whenever SyncLoadHField is asserted. Also, video timing generator 602 should assert LastLineOfVFP when video timing generator 602 has entered the last line of vertical front porch. Control bit register may be a two-bit register writeable via configuration bus 620. Time-out counter 606 may be a conventional decrementing counter configured to load a predetermined value on reset. In a preferred embodiment, the predetermined value corresponds to the number of clocks (at the rate of one-fourth dot clock) required to count for two horizontal line intervals. Time-out counter 606 should assert SyncTimeOut_n whenever the counter expires. Time-out counter 606 only counts when it is enabled. In the embodiment shown, time-out counter 606 is only enabled when SyncTimingHold is asserted and TimeOutEnable is also asserted. (See AND gate 622.) Time-out counter 606 reloads whenever SyncTimingHold is unasserted. (See inverter 624.) Latches 608 and 610 are provided so that external sync state machine 600 can detect a transition on the ext_sync_in input.

Figure 7:
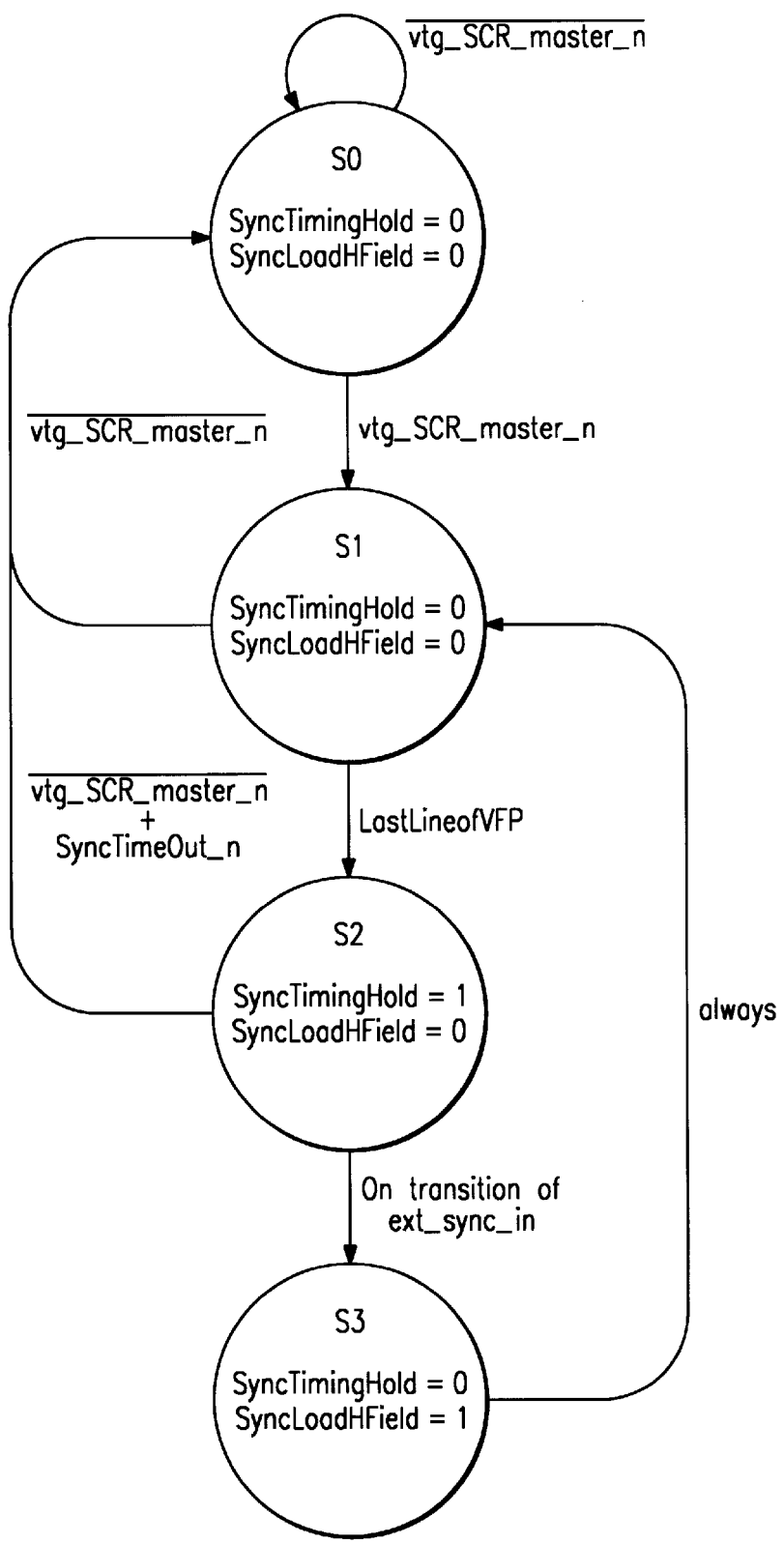
FIG. 7 is a state diagram illustrating the preferred operation of the external sync state machine of FIG. 6.

The operation of external sync state machine 600 will now be described with reference to the state diagram of FIG. 7. Assume operation begins at state S0. If sync logic 512 is in master mode, then external sync state machine 600 will remain in state S0 indefinitely, during which state both SyncTimingHold and SyncLoadHField are unasserted. The result of this state is that external sync state machine 600 will not interfere with the normal free-running operation of video timing generator 602. If sync logic 512 is in slave mode (if vtg_SCR_master_n is high), then external sync state machine 600 will transition from state S0 to state S1. In state S1, the state machine waits for LastLineOfVFP to become asserted. While it waits, it still does not interfere with the normal operation of video timing generator 602 because both SyncTimingHold and SyncLoadHField are still unasserted. Once video timing generator 602 has entered the last line of vertical front porch, as indicated by an assertion of LastLineOfVFP, the state machine transitions to state S2, where it waits for a transition on the ext_sync_in line. While it waits for this transition, it halts video timing generator 602 by asserting SyncTimingHold. If a transition occurs on ext_sync_in before time-out counter 606 expires, then the state machine transitions to state S3, at which time it unasserts SyncTimingHold and asserts SyncLoadHField. The result of state S3 is that video timing generator 602 enters vertical sync immediately. From state S3, operation always resumes at state S1. If, on the other hand, time-out counter 606 expires in state S2 before a transition is detected on ext_sync_in, then the state machine transitions from state S2 to state S0. The result is that video timing generator 602 is once again allowed to continue running normally. (If sync logic 512 is configured as a slave, then external sync state machine 600 will enter state S1 again immediately after state S0, where it will once again try to synchronize itself with the ext_sync_in signal. Alternatively, circuitry may be provided to automatically reset the master/slave bit in control bit register 604 whenever a time-out occurs in state S2 so that sync logic 512 will then begin operating as a master.) If sync logic 512 is reconfigured to act as a master at any time while the state machine is in states S1 or S2, then the state machine will transition immediately to state S0, where it will remain until sync logic 512 is once again configured as a slave.

Additional flexibility may be achieved by adding control bits and circuitry to optionally invert the state of the ext_sync_in input in each slave, or to determine in each slave which assertion level of the left/right stereo state bit corresponds to the left or right channels.

While the invention has been described in detail in relation to a particular embodiment, it will be obvious to those skilled in the art that many modifications can be made to the described embodiment without departing from the spirit and scope of the invention. For example, the invention may be used with fill-screen stereo applications as well as with stereo-in-a-window applications. Moreover, the signal assertion levels described herein, and the type of video timing signals described herein, are intended to be illustrative only and are not intended to limit the scope of the invention. Rather, obvious adaptations and modifications of all of the above are intended to remain within the scope of the following claims.

What is claimed is:

1. A method of substantially synchronizing the vertical refresh cycles in, and the display of left and right channels by, first and second computer graphics display systems in a multi-display stereoscopic computer graphics system, said method comprising the steps of:
   a) changing the state of a synchronization signal synchronously with vertical refresh activity in said first computer graphics display system;
   b) displaying a predetermined one of the left and right channels in said first computer graphics display system responsive to the state of said synchronization signal;
   c) communicating said synchronization signal from said first to said second computer graphics display systems;
   d) beginning vertical retrace in said second computer graphics display system when said synchronization signal changes states; and
   e) displaying a predetermined one of the left and right channels in said second computer graphics display system responsive to the state of said synchronization signal.

2. The method of claim 1, wherein said step a) comprises changing the state of said synchronization signal when said first computer graphics display system enters vertical front porch.

3. A method of substantially synchronizing the vertical refresh cycles of first and second computer graphics display systems, said method comprising the steps of:
   a) displaying a first frame in said first computer graphics display system;
   b) displaying a second frame in said second computer graphics display system;
   c) halting the video timing generator in said second computer graphics display system at a time during vertical front porch in said second computer graphics display system;
   d) causing a transition on a synchronization signal synchronously with the beginning of vertical front porch in said first computer graphics display system;
   e) after step c) and in said second computer graphics display system, waiting a predetermined time for a transition of said synchronization signal; and
   f) if a transition of said synchronization signal occurs during step e) during said predetermined time, causing said second computer graphics display system to immediately enter vertical sync.

4. The method of claim 3, further comprising the step of:
   g) if a transition of said synchronization signal does not occur during step e) during said predetermined time, causing said second computer graphics display system to enter vertical sync at the end of said predetermined time.

5. The method of claim 3, wherein said step c) comprises halting the video timing generator in said second computer graphics display system during the last line of vertical front porch in said second computer graphics display system.

6. The method of claim 3, wherein said predetermined time is substantially equal to two horizontal line times.

7. The method of claim 3, further comprising a third computer graphics display system, wherein the synchronization signal is connected in series between the first, second and third computer graphics display systems, wherein the first computer graphics display system is a master and the second and third computer graphics display systems are slaves, and wherein the method further comprises the step of:
   g) if a transition of said synchronization signal does not occur during step e) during said predetermined time, causing the second computer graphics display system to reconfigure itself as a master.

8. Apparatus for substantially synchronizing the vertical refresh cycles in, and the display of the left and right channels by, first and second computer graphics display systems in a multi-display stereoscopic computer graphics system, comprising:
   a synchronization signal coupled between the first and second computer graphics display systems;
   switching circuitry in the first computer graphics display system, the switching circuitry operable to change the state of the synchronization signal synchronously with vertical refresh activity in the first computer graphics display system;
   first display apparatus operable to display a predetermined one of the left and right channels in the first computer graphics display system responsive to the state of the synchronization signal;
   vertical retrace circuitry in the second computer graphics display system, the vertical retrace circuitry operable to cause vertical retrace to begin in the second computer graphics display system when the synchronization signal changes states; and
   second display apparatus operable to display a predetermined one of the left and right channels in the second computer graphics display system responsive to the state of the synchronization signal.

9. The apparatus of claim 8, wherein the switching circuitry changes the state of the synchronization signal when the first computer graphics display system enters vertical front porch.

10. Apparatus for substantially synchronizing the vertical refresh cycles of first and second computer graphics display systems, comprising:
    a video timing generator in the second computer graphich display system operable to halt at a time during vertical front porch in the second computer graphics display system;
    a synchronization signal coupled between the first and second computer graphics display systems;
    switching circuitry in the first computer graphics display system operable to cause a transition on the synchronization signal synchronously with the beginning of vertical front porch in the first computer graphics display system;
    wherein, after halting, the video timing generator in the second computer graphics display system waits a predetermined time for a transition of the synchronization signal and, if a transition of the synchronization signal occurs during the predetermined time, the video timing generator causes the second computer graphics display system to immediately enter vertical sync.

11. The apparatus of claim 10, wherein:
    if a transition of the synchronization signal does not occur during the predetermined time, the video timing generator causes the second computer graphics display system to enter vertical sync at the end of the predetermined time.

12. The apparatus of claim 10, wherein the video timing generator halts during the last line of vertical front porch in the second computer graphics display system.

13. The apparatus of claim 10, wherein the predetermined time is substantially equal to two horizontal line times.

14. The method of claim 10, further comprising a third computer graphics display system, wherein the synchronization signal is coupled in series between the first, second and third computer graphics display systems, wherein the first computer graphics display system is a master and the second and third computer graphics display systems are slaves, and wherein:

- if a transition of the synchronization signal does not occur during the predetermined time, the second computer graphics display system reconfigures itself as a master.

* * * * *

UNITED STATES PATENT AND TRADEMARK OFFICE
CERTIFICATE OF CORRECTION

PATENT NO.    : 6,122,000
DATED         : September 19, 2000
INVENTOR(S)   : Daniel E. Yee et al.

It is certified that error appears in the above-identified patent and that said Letters Patent is hereby corrected as shown below:

<u>Column 10,</u>
Line 42, delete "graphich" and insert therefor -- graphics --

Signed and Sealed this

Twenty-third Day of July, 2002

*Attest:*

*Attesting Officer*

JAMES E. ROGAN
*Director of the United States Patent and Trademark Office*